US009054889B2

(12) United States Patent
Jung et al.

(10) Patent No.: US 9,054,889 B2
(45) Date of Patent: Jun. 9, 2015

(54) METHOD AND APPARATUS FOR PROVIDING DYNAMICALLY CHANGED UPNP DESCRIPTION

(75) Inventors: Dong-shin Jung, Suwon-si (KR); Kiran Bharadwaj Vedula, Bangalore (IN); Subramanian Krishnamoorthy, Bangalore (IN); Sreekanth Siddapur Channakeshava, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 12/143,882

(22) Filed: Jun. 23, 2008

(65) Prior Publication Data

US 2008/0316941 A1    Dec. 25, 2008

Related U.S. Application Data

(60) Provisional application No. 60/945,627, filed on Jun. 22, 2007.

(30) Foreign Application Priority Data

Feb. 20, 2008    (KR) .................. 10-2008-0015448

(51) Int. Cl.
H04L 12/26 (2006.01)
H04L 12/28 (2006.01)
H04L 12/66 (2006.01)

(52) U.S. Cl.
CPC .......... H04L 12/2814 (2013.01); H04L 12/281 (2013.01); H04L 12/66 (2013.01)

(58) Field of Classification Search
None
See application file for complete search history.

(56) References Cited

U.S. PATENT DOCUMENTS

| | | | |
|---|---|---|---|
| 6,725,281 B1* | 4/2004 | Zintel et al. | 719/318 |
| 7,085,814 B1* | 8/2006 | Gandhi et al. | 709/208 |
| 7,539,152 B2* | 5/2009 | Morioka | 370/255 |
| 2001/0033554 A1* | 10/2001 | Ayyagari et al. | 370/328 |
| 2003/0101294 A1 | 5/2003 | Saint-Hilaire et al. | |
| 2003/0114190 A1* | 6/2003 | Want et al. | 455/557 |
| 2005/0125564 A1 | 6/2005 | Bushmitch et al. | |
| 2005/0198222 A1 | 9/2005 | Kohinata et al. | |
| 2005/0232283 A1* | 10/2005 | Moyer et al. | 370/401 |
| 2006/0056408 A1* | 3/2006 | Cho | 370/389 |
| 2006/0059003 A1 | 3/2006 | Requena et al. | |
| 2006/0067489 A1 | 3/2006 | Morioka | |
| 2006/0279774 A1 | 12/2006 | Matsuoka et al. | |
| 2007/0143489 A1 | 6/2007 | Pantalone | |
| 2007/0259683 A1* | 11/2007 | Hartikainen et al. | 455/550.1 |

OTHER PUBLICATIONS

Communication dated Jul. 7, 2011 from the European Patent Office in counterpart European Patent Application No. 08766391.0.

(Continued)

*Primary Examiner* — Gregory Sefcheck
*Assistant Examiner* — Daniel Mitchell
(74) *Attorney, Agent, or Firm* — Sughrue Mion, PLLC

(57) ABSTRACT

Provided is a method, medium and apparatus for providing a dynamically changed universal plug and play (UPnP) description. The method includes sensing a change of a service configuration of a device complying with a predetermined standard, updating a description including information about a service based on the change of the service configuration, and advertising that the description is updated. Thus, the service configuration is matched with the description and a control point can correctly control the device whose service configuration is changed.

15 Claims, 7 Drawing Sheets

(56) References Cited

OTHER PUBLICATIONS

Sundramoorthy V et al: "On Consistency Maintenance in Service Discovery", Parallel and Distributed Processing Symposium, 2006. IPDPS 2006. 20th International Rhodes Island, Greece Apr. 25-29, 2006, IEEE, Apr. 25, 2006, pp. 1-10, XP010920244, DOI: ISBN: 978-1-4244-0054-6.

Office Action issued Mar. 7, 2012 in the corresponding Chinese Application No. 200880103215.9.

International Search Report (PCT/ISA/210) dated Nov. 25, 2008 from the International Searching Authority in counterpart Application No. PCT/KR2008/003430.

Written Opinion (PCT/ISA/237) dated Nov. 25, 2008 from the International Searching Authority in counterpart Application No. PCT/KR2008/003430.

Communication dated Aug. 28, 2013 issued by the State Intellectual Property Office of the People's Republic of China in counterpart Chinese Application No. 200880103215.9.

Communication dated May 6, 2013, issued by the State Intellectual Property Office of P.R. China in counterpart Chinese Application No. 200880103215.9.

Communication dated May 13, 2013, issued by the European Patent Office in counterpart European Application No. 08766391.0.

Communication, dated Dec. 3, 2012, issued by the State Intellectual Property Office of the People's Republic of China in counterpart Chinese Patent Application No. 200880103215.9.

Communication dated Mar. 13, 2014 issued by Korean Intellectual Property Office in counterpart Korean Application No. 10-2008-0015448.

* cited by examiner

FIG. 7A

```xml
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType> urn:schemas-upnp-org:device:deviceType:v </deviceType>
    <friendlyName>short user-friendly title</friendlyName>
    <manufacturer>manufacturer name</manufacturer>
    <manufacturerURL>URL to manufacturer site</manufacturerURL>
    <modelDescription>long user-friendly title</modelDescription>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <UPC>Universal Product Code</UPC>
    <iconList>
      <icon>
        <mimetype>image/format</mimetype>
        <width>horizontal pixels</width>
        <height>vertical pixels</height>
        <depth>color depth</depth>
        <url>URL to icon</url>
      </icon>
      XML to declare other icons, if any, go here
    </iconList>
    <serviceList>
      <service>
        <serviceType>urn:schemas-upnp-org:service:serviceType:v</serviceType>
        <serviceId>urn:upnp-org:serviceId:serviceID</serviceId>
        <SCPDURL>URL to service description</SCPDURL>
        <controlURL>URL for control</controlURL>
        <eventSubURL>URL for eventing</eventSubURL>
      </service>
      Declarations for other services defined by a UPnP forum working committee (if any) go here
      Declarations for other services added by UPnP vendor (if any) go here
    </serviceList>
    <deviceList>
      Description of embedded devices defined by UPnP Forum working committee (if any) goes here
      Description of embedded devices added by UPnP vendor (if any) goes here
    </deviceList>
    <presentationURL>URL for presentation</presentationURL>
  </device>
</root>
```

FIG. 7B

```xml
<?xml version="1.0"?>
<scpd xmlns="urn:schemas-upnp-org:service-1-0">
 <specVersion>
  <major>1</major>
  <minor>0</minor>
 </specVersion>
 <actionList>
  <action>
   <name>actionName</name>
   <argumentList>
    <argument>
     <name>formalParameterName </name>
     <direction>in xor out</direction>
     <retval />
     <relatedStateVariable>stateVariableName </relatedStateVariable>
    </argument>
    Declarations for other arguments defined by UPnP Forum w orking committee (if any) go here
   </argumentList>
  </action>
  Declarations for other actions defined by UPnP Forum working  committee (if any) go here
  Declarations for other actions added by UPnP vendor (if any)  go here
 </actionList>
 <serviceStateTable>
  <stateVariable sendEvents="yes">
   <name>variableName</name>
   <dataType>variable data type</dataType>
   <defaultValue>default value</defaultValue>
   <allowedValueList>
    <allowedValue>enumerated value</allowedValue>
    Other allowed values defined by UPnP Forum working commi ttee (if any) go here
   </allowedValueList>
  </stateVariable>
  <stateVariable sendEvents="yes">
   <name>variableName</name>
   <dataType>variable data type</dataType>
   <defaultValue>default value</defaultValue>
   <allowedValueRange>
    <minimum>minimum value</minimum>
    <maximum>maximum value</maximum>
    <step>increment value</step>
   </allowedValueRange>
  </stateVariable>
  Declarations for other state variables defined by UPnP Forum working committee (if any) go here
  Declarations for other state variables added by UPnP vendor (if any) go here
 </serviceStateTable>
</scpd>
```

METHOD AND APPARATUS FOR PROVIDING DYNAMICALLY CHANGED UPNP DESCRIPTION

CROSS-REFERENCE TO RELATED PATENT APPLICATION

This application claims priority of U.S. Provisional Patent Application No. 60/945,627, filed on Jun. 22, 2007, in the U.S. Patents and Trademark Office, and Korean Patent Application No. 10-2008-0015448 filed on Feb. 20, 2008, in the Korean Intellectual Property Office, the disclosures of which are incorporated herein in their entirety by reference.

BACKGROUND

1. Field

Methods and apparatuses consistent with the present invention generally relate to a universal plug and play (UPnP) device on a UPnP network, and more particularly, to a method and apparatus for providing a UPnP description.

2. Description of the Related Art

A home network has been developed to provide a method for easy and convenient communication between devices, such as information home appliances, wireless communication devices, and personal computer (PC) related devices, and services. UPnP is one of a number of middlewares which provide home network connections. UPnP provides a means for connecting and allowing communication among various devices and for providing a user with the services of the devices in a standardized way without a need for manipulation by an administrator or by user in a network environment such as home or a small office having no special administrator. In other words, devices connected to a UPnP network can easily access the network in order to inform other devices of available functions and services, can allow other devices to control the functions and services, and, when the other devices do not desire to use the functions and services, can enable the other devices to be removed from the UPnP network.

In a UPnP environment, devices connected to a UPnP network may be roughly classified as a control device (hereinafter will be referred to as a "control point") which controls devices or as a controlled device (hereinafter will be referred to as UPnP devices) which is controlled by the control point. The UPnP network communicates according to a typical transmission control protocol(TCP)/Internet protocol(IP) because it is a TCP/IP-based network. When a UPnP device initially accesses the UPnP network, an IP address is allocated to the UPnP device for address designation. In order for a user to control a controlled device connected to the UPnP network by using the control point, a discovery process first has to be performed. If a controlled device is discovered, the services that can be performed in the controlled device have to be determined. In order to obtain service information, the controlled device generates a description of itself and provides the generated description to the control point. The description includes manufacturer information and product information of the controlled device and service information about any services that can be performed by the controlled device.

SUMMARY OF THE INVENTION

One or more exemplary embodiments of the present invention provide a method, medium and apparatus for providing a UPnP description which addresses dynamically changing device descriptions and service descriptions.

According to an aspect of the present invention, there is provided a method of providing a description. The method includes sensing a change of a service configuration of a device complying with a predetermined standard, updating a description of information about a service based on the change of the service configuration, and advertising that the description is updated.

According to another aspect of the present invention, there is provided a computer-readable recording medium having recorded thereon a program for executing the method.

According to another aspect of the present invention, there is provided an apparatus for providing a description. The apparatus includes a sensing unit which senses a change of a service configuration of a device, the device complying with a predetermined standard, a description updating unit which updates a description of information about a service based on the change of the service configuration, and a communicating unit which advertises that the description is updated.

BRIEF DESCRIPTION OF THE DRAWINGS

The above and other exemplary aspects and advantages of the present invention will become more apparent by the following detailed description of exemplary embodiments thereof with reference to the attached drawings in which:

FIGS. 7A and 7B are diagrams for explaining a method of providing a UPnP description by using an open service gateway initiatives (OSGi) framework according to another exemplary embodiment of the present invention.

DETAILED DESCRIPTION OF EXEMPLARY EMBODIMENTS OF THE INVENTION

Hereinafter, embodiments of the present invention will be described in detail with reference to the accompanying drawings. Although exemplary embodiments of the present invention will be described based on the use of a UPnP network as the middleware platform implementing the home network, it can be easily construed by those of ordinary skill in the art that various equivalent home network middleware platforms may also be applied to the exemplary embodiments of the present invention.

Figure 1:
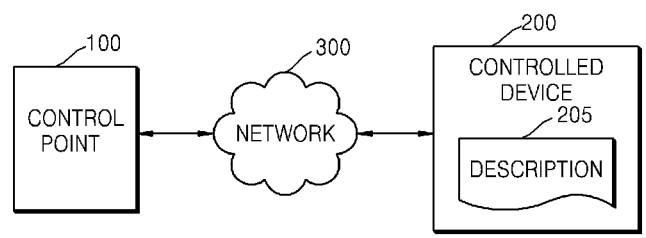
FIG. 1 illustrates an environment in which exemplary embodiments of the present invention are implemented.

FIG. 1 illustrates an environment in which exemplary embodiments of the present invention are implemented, including at least one control point 100 and at least one controlled device 200. In FIG. 1, one control point 100 and one controlled device 200 are illustrated for convenience. A network 300 is the network formed by connecting the control point 100 and the controlled device 200. If it is assumed that the control point 100 and the controlled device 200 are implemented in a UPnP network, the network 300 may be a UPnP network and it will be easily understood by those of ordinary skill in the art that the UPnP network complies with a standard transmission control protocol(TCP)/Internet protocol(IP)-based communication protocol.

In the UPnP environment, the network 300 may include a dynamic host configuration protocol (DHCP) server, and the control point 100 and the controlled device 200 may be allocated IP addresses through the DHCP server when they initially access the network 300. At this time, the control point 100 and the controlled device 200 allocated the IP addresses are DHCP clients. Once the control point 100 and the controlled device 200 are allocated the IP addresses through address designation, a process of discovering the controlled device 200 is performed. The control point 100 may discover the controlled device 200 by using a simple service discovery protocol (SSDP).

The discovery process may be performed in two ways. One of the two ways is that the control point 100 searches for the controlled device 200 connected to the network 300 in order to discover the controlled device 200. The other way is that the controlled device 200 informs the network 300 that the controlled device 200 becomes available when the controlled device 200 is connected with the network 300 and thus the control point 100 discovers the controlled device 200 based on the information.

In the latter way, it will be understood by those of ordinary skill in the art that the controlled device 200 may use an advertisement message defined by a UPnP forum as a communication message for informing the network 300 of the availability of the controlled device 200. The advertisement message is multicast to a UPnP network by the controlled device 200 in order to advertise the existence of the controlled device 200, and more specifically, to advertise the availability of the controlled device 200 and a service thereof Since the advertisement message includes an address of a source (i.e., the controlled device 200), the control point 100 having received the advertisement message may discover the controlled device 200 by referring to the address.

Although the control point 100 discovers the controlled device 200 through the discovery process, the amount of information held by the control point 100 to control the controlled device 200 is very small. Thus, in order to fully recognize information about the controlled device 200 and a function (i.e., a service), of the controlled device 200 for interaction with the controlled device 200, the control point 100 has to check a detailed description 205 of the controlled device 200 and of a service thereof provided by the controlled device 200. The description 205 may be provided by the controlled device 200 through a particular address that may be a unique address on a network, such as a uniform resource locator (URL). It will be understood by those of ordinary skill in the art that a UPnP description expressed in an extensible markup language (XML) in the field of UPnP technology may be provided by the controlled device 200 and the UPnP description may include unique manufacture information of a provider, e.g., a model name, a serial number, a manufacturer name, and a manufacturer URL.

Figure 2:
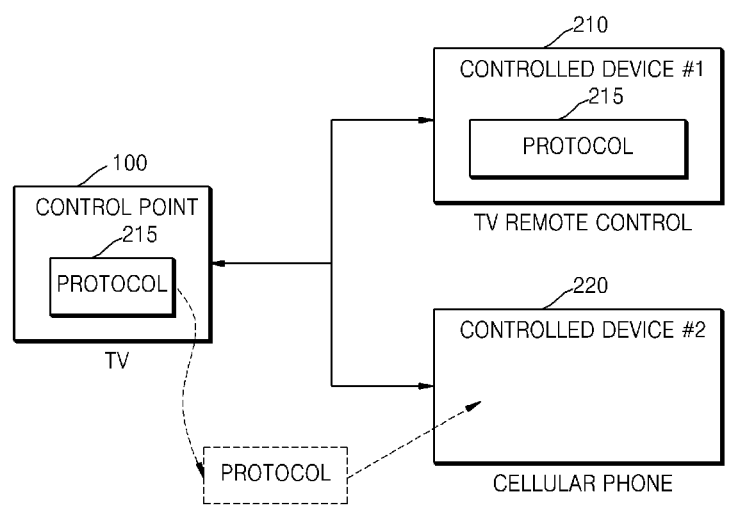
FIG. 2 illustrates installing a protocol for providing a new service according to exemplary embodiments of the present invention.

FIG. 2 illustrates the installation of a protocol for providing a new service is installed according to exemplary embodiments of the present invention. In FIG. 2, it is assumed that one control point 100 and two controlled devices 210 and 220 exist on a network, and the control point 100 is a television (TV) having installed therein a protocol 215 capable of controlling the TV. The controlled device #1 210 is assumed to be a TV remote control having installed therein the protocol 215 capable of controlling the TV and the controlled device #2 220 is assumed to be a cellular phone having installed therein no protocol related to the TV.

Herein, a protocol means a command set, a communication rule, or software for providing a particular service. The protocol may be provided as firmware or as an application program for controlling existing hardware. Rather than a small-size processor capable of performing only a particular function within a device, a general-purpose processor is used, which is capable of performing various functions according to an installed program. Thus, a new function corresponding to a new protocol can be provided through the device by installing the new protocol in the device. It will be easily construed by those of ordinary skill in the art that a device control protocol (DCP) for controlling a controlled device may be used as the protocol in the field of UPnP technology. Examples of a standard DCP provided by the UPnP forum may include an Internet gateway device (IGD) protocol, a media server and media renderer protocol, a printer device and print basic service protocol, a heat ventilation and air conditioning (HVAC) protocol, a security device protocol, and a wireless local area network (WLAN) access point (AP).

The protocol 215 capable of controlling the TV is commonly installed both in the control point 100, operating as the TV, and in the controlled device #1 210, operating as the TV remote control. Thus, the controlled device #1 210 interacts with the control point 100 and controls the control point 100 (e.g., turns on the TV or changes a TV channel). On the other hand, the controlled device #2 220, operating as the cellular phone, has installed therein no protocol capable of controlling the TV and thus cannot control the control point 100. However, if the controlled device #2 220 has minimum hardware to operate as a TV remote control (e.g., an infrared transmission/reception unit,) and has installed therein the protocol 215 for controlling the TV, it can also function as a TV remote control like the controlled device #1 210. In other words, the function of the cellular phone can be extended so that the cellular phone can also operate as a TV remote control.

Thus, based on the above, a method to install a protocol capable of providing a new service to a controlled device and to provide a corresponding description will be described. It is assumed that the controlled device has the minimum hardware necessary to provide a corresponding service and that the protocol can be installed in the controlled device.

Figure 3:
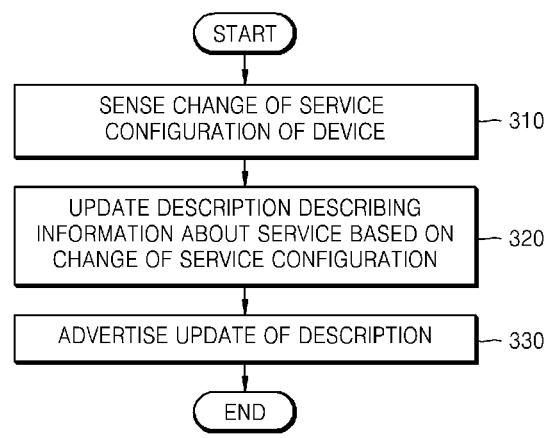
FIG. 3 is a flowchart illustrating a method of providing a UPnP description according to an exemplary embodiment of the present invention.

FIG. 3 is a flowchart illustrating a method of providing a UPnP description according to an exemplary embodiment of the present invention.

Referring to FIG. 3, a change of a service configuration of a UPnP device is sensed in operation 310. In general, the service configuration may be changed when a new protocol is added to an existing protocol of the UPnP device or when the existing protocol of the UPnP device is removed. For example, as described with reference to FIG. 2, by installing a protocol capable of providing a new service that cannot be provided through an existing protocol installed in the UPnP device, the UPnP device can provide the new service. If the existing protocol that has been installed in the UPnP device is not used any longer, it may be removed from the UPnP device in order to secure additional memory or available resources in the UPnP device. Thus, a new protocol can be installed in the UPnP device, and a protocol can also be removed from the UPnP device if necessary. Although it will be assumed below that a change of the service configuration is the installation of a new protocol, it should be understood that any installed protocol may also be removed when necessary.

The service types that can be provided by a UPnP device may be changed by the installation or removal of a protocol. This is because a control point generally has information including a detailed description of the functions of the UPnP device (i.e., the service or services that can be provided by the UPnP device). In other words, the control point can control the UPnP device only after it has been is provided with a description from the UPnP device. Thus, in spite of the installation in a UPnP device of a protocol providing a new service, a control point which only has information about the functions of the UPnP device prior to the new installation cannot control the new service because of a mismatch between the current description of the UPnP device and the new service of the UPnP device. In order to resolve the mismatch between the description and the service, the UPnP device has to sense a change in the service configuration by monitoring the service configuration in real time or at predetermined time intervals.

A particular variable indicating a state change may be monitored as a means for sensing a change, and state sensing software or an event listener may be used as a unit for sensing a change. Herein, an event listener may be an operation unit which provides a criterion for determining a change when the change occurs in a peripheral environment or a state of a UPnP system or a UPnP network. For example, the contents of a UPnP device may be monitored as a variable that indicates a state change when a new protocol is installed or removed. The state sensing software or the event listener can monitor such a variable in order to recognizes when there has been a change in the service configuration of the UPnP device by the addition or removal of a protocol.

In operation 320, a description including information about a service is updated based on the change of the service configuration sensed in operation 310. A method of updating the description may be implemented in a way similar to generating the description when the UPnP device initially accesses the UPnP network. In the UPnP environment, a description may be classified as a device description, describing a physical and logical container or as a service description, describing a function that can be provided by the UPnP device. If a newly installed protocol merely extends an existing function of the UPnP device, only the service description may be updated during update of the description of the UPnP device.

In operation 330, it is advertised that the update of the description has been completed. Such advertisement may be performed by multicasting an advertisement message that indicates to the UPnP network the availability of the changed service and by then unicasting an address, including the updated description, to a control point in response to a request from the control point which has recognized the prior advertisement message.

Figure 4:
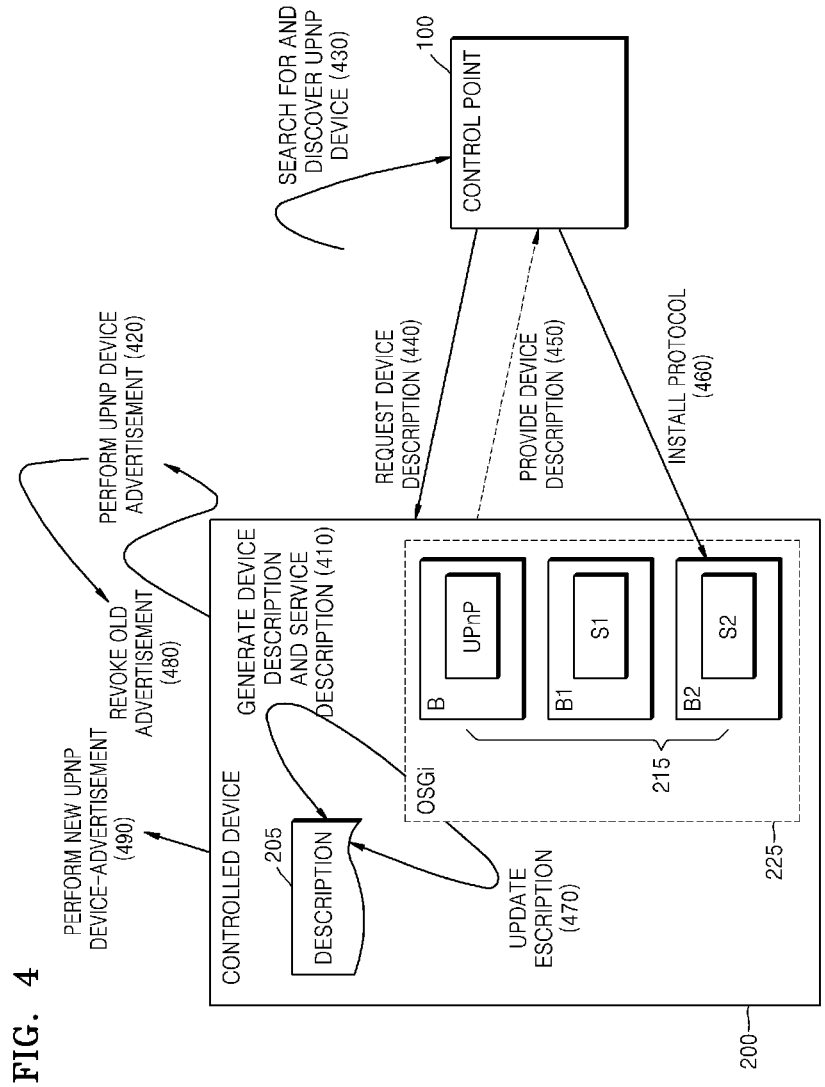
FIG. 4 is a diagram for explaining a method of providing a UPnP description and a method of performing UPnP device advertisement according to another exemplary embodiment of the present invention.

FIG. 4 is a diagram for explaining a method of providing a UPnP description and a method of performing UPnP device advertisement according to another exemplary embodiment of the present invention. In this embodiment, a UPnP device implemented on an open service gateway initiatives (OSGi) framework is illustrated. The OSGi framework, which is a type of middleware framework that independently operates in an operating system or on a service platform, is a system environment in which a component can be dynamically installed and removed by using a Java application. The OSGi framework provides a service by installing a physical bundle in the format of a Java archive (JAR) file including a Java class file. The bundle constitutes a basic unit of service distribution and management. The OSGi framework provides an environment for an manages the bundle and performs registration, reference, execution, and removal of a service using a service registry. It may be easily understood by those of ordinary skill in the art that the OSGi framework officially supports UPnP in the OSGi release version 3. Based on such assumption, components illustrated in FIG. 4 will be described in brief and a method of providing a UPnP description and a method of performing advertisement will be described.

In FIG. 4, a control point 110 and a controlled device 200 are illustrated and the controlled device 200 includes an OSGi framework 225. As mentioned previously, the OSGi framework 225 is a system environment in which protocols capable of providing services (i.e., a bundle, 215) can be installed. The controlled device 200 has a description 205 thereof that describes in detail the device and the service information related to the controlled device 200.

In operation 410, the controlled device 200 generates a device description and a service description. If the controlled device 200 initially accesses a UPnP network, the generation of the device description may precede the generation of the service description. In operation 420, the availability of the controlled device 200 is multicast to the UPnP network in order to inform the control point 100 of the existence of the controlled device 200. In operation 430, the control point 100 searches for and discovers the controlled device 200. As described with reference to FIG. 1, the control point 100 does not yet have a detailed description of the controlled device 200 in operation 430. In operation 440, the control point 100 sends a request for the device description to the controlled device 200 by referring to an address of the controlled device 200 included in the advertisement message multicast in operation 420. In operation 450, the controlled device 200 provides the device description in response to the request sent by the control point 100. Since the controlled device 200 knows the address of the control point 100, it may unicast the device description to the control point 100. The device description generated in the UPnP environment may also be sent by delivering a URL including the device description to the control point 100.

Through the above-description process, the initial device description is delivered to the control point 100, and the control point 100 may control the controlled device 200 based on the device description. Hereinafter, a process of installing the protocol 215 capable of providing a new function to the controlled device 200 will be described.

In the current embodiment of the present invention, a function of the controlled device 200 can be extended by installing a function-based protocol 215 by using the OSGi framework. In operation 460, the control point 100 installs the protocol 215 in the controlled device 200. In FIG. 4, three protocols 215 are installed. Function—based services such as UPnP, S1, and S2 are illustrated in the protocols 215, respectively, by way of example. It is assumed that service types that can be provided by the controlled device 200 are changed by installation of a new protocol B2. However, since the device description has already been provided to the control point 100 in operation 450 prior to a change of a service configuration of the controlled device 200, the control point 100 cannot control the newly installed protocol B2. In other words, mismatch between the service configuration and the device description occurs. Thus, in operation 470, the description 205 is updated based on the changed service configuration.

In operation 480, an old advertisement is revoked in order to advertise that the device description provided to the control point 100 is an old version that is not valid any longer. In operation 490, the new advertisement is performed. To this end, a new advertisement message may be multicast to the UPnP network or may be unicast to the particular control point 100. After the new advertisement is performed, the above-described description providing process is repeated, thereby providing the updated description to the control point 100.

The method of providing a UPnP description updated due to installation of a new protocol and the method of performing UPnP device advertisement have been described in detail. According to the current embodiment of the present invention, a function of a UPnP device can be extended by installing a protocol capable of providing a new service in addition to any services of an existing limited protocol installed in the UPnP device, and a control point can correctly control a controlled device whose service configuration has been changed by updating a description and performing new advertisement.

Figure 5:
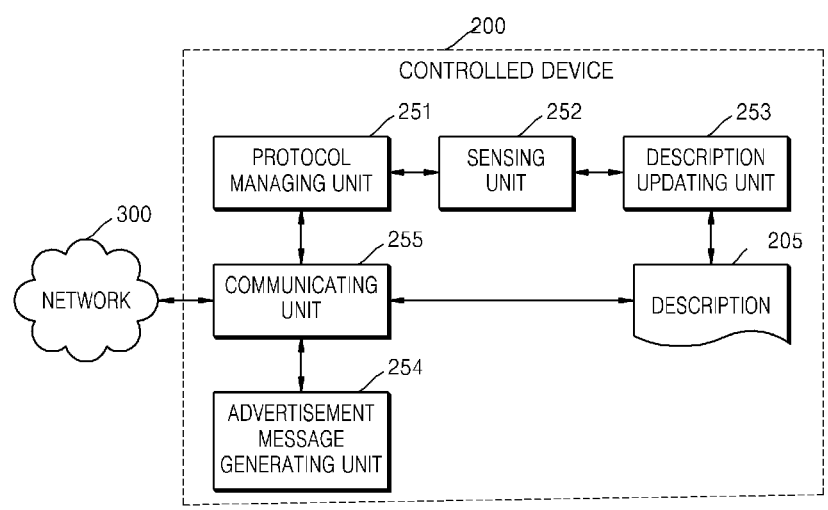
FIG. 5 is a block diagram for explaining an apparatus for providing a UPnP description according to an exemplary embodiment of the present invention.

FIG. 5 is a block diagram for explaining an apparatus for providing a UPnP description according to an embodiment of the present invention, where one controlled device 200 connected to the network 300 is illustrated. The controlled device 200 includes a protocol managing unit 251, a sensing unit 252, a description updating unit 253, the description 205, an advertisement message generating unit 254, and a communicating unit 255.

The protocol managing unit 251 installs a new protocol in the controlled device 200, removes an existing protocol installed in the controlled device 200, and may also perform management by referring an existing protocol or executing a service that can be provided by an existing protocol. The protocol managing unit 251 may be implemented as a service registry in an OSGi environment.

The sensing unit 252 senses a change in a service configuration of the controlled device 200. As mentioned previously with reference to FIG. 3, a particular variable indicating a state change may be used to sense a change in the service configuration.

The description updating unit 253 updates the description 205 of the controlled device 200 based on the change of the service configuration. The description 205 may include a device description and a service description generated at the time of initial access made by the controlled device 200 to the network 300, and may be continuously updated with the latest information by the description updating unit 253.

The advertisement message generating unit 254 generates an advertisement message for informing the network 300 of the controlled device 200. A way to multicast the advertisement message to the network 300 by using an SSDP in the UPnP environment may be easily recognized by those of ordinary skill in the art. The advertisement message generating unit 254 may be a physical device such as a small-size processor or a network controller and requires the processing ability to generate and process an advertisement message according to a message format designed to communicate with a control point (not shown).

The communicating unit 255 is used by the controlled device 200 to communicate with the network 300. To this end, the communicating unit 255 receives a search message or a description request message from a controlled device (not shown) or sends an advertisement message to the controlled device. The communicating unit 255 also may revoke a previous device advertisement that was sent prior to the description update and then may perform new device-advertisement after the description update. Since a UPnP network uses a TCP/IP-based communication protocol, the communicating unit 255 has to be capable of performing typical TCP/IP communication. The communicating unit 255 may also use general communication protocols of UPnP. For example, the communicating unit 255 may use a Simple Service Discover Protocol (SSDP) for discovery, a generic event notification architecture (GENA) for event execution, and a simple object access protocol (SOAP) for control message delivery. The communicating unit 255 may be implemented as a physical device such as a typical network interface card (NIC).

Figure 6:
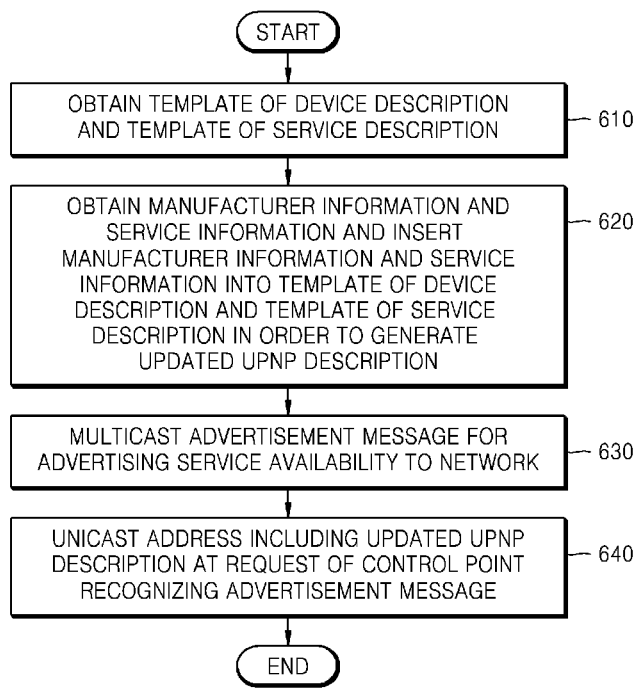
FIG. 6 is a flowchart illustrating a method of providing a UPnP description and a method of performing UPnP device advertisement according to another exemplary embodiment of the present invention.

FIG. 6 is a flowchart illustrating a method of providing a UPnP description and a method of performing UPnP device advertisement according to another exemplary embodiment of the present invention.

Referring to FIG. 6, a template of a device description and a template of a service description according to the format of a UPnP description are obtained. Herein, a template means a format of a description, which is agreed by a controlled device (i.e., a UPnP device), and a control point in order to provide and analyze the description. The template may be used when a description is initially generated or when the generated description is updated with the latest information.

In operation 620, manufacturer information and service information are obtained and are inserted into the template of the device description and the template of the service description in order to generate an updated description. In this process, the controlled device inserts a value into a corresponding item of the template based on the obtained manufacturer information and service information. A description may be composed of pairs of description items and values corresponding thereto. For example, a name of a manufacturer which manufactures a device may be obtained and inserted into an item '<manufacturer>' of a device description of a UPnP description.

In operation 630, the controlled device generates a new advertisement message for informing a network of service availability and multicasts the generated new advertisement message to the network. The new advertisement message informs the network that the UPnP description provided prior to a change of a service configuration of the controlled device is not valid any longer and that an updated UPnP description can be provided from the controlled device.

In operation 640, the controlled device unicasts an address, including the updated UPnP description, in response to a request from the control point which has recognized the advertisement message. The control point may be provided with the updated description through the unicast address and thus can correctly control the service of the controlled device.

FIGS. 7A and 7B are diagrams for explaining a method of providing a UPnP description by using an OSGi framework according to another exemplary embodiment of the present invention. As previously described with reference to FIG. 4, the OSGi framework provides an environment that is useful for installation, management, and removal of a protocol providing a new service, and a service configuration change caused by installation and removal of the protocol has to be reflected by the UPnP description. Thus, a method of updating the UPnP description from the OSGi framework will be briefly described by way of example.

FIG. 7A illustrates an extract from a device description provided by the UPnP forum. As to some of items of the device description, 'deviceType' describes a device type and a UPnP device implemented on the OSGi framework may be defined as '1'. 'service'indicates a service that can be provided by the UPnP device and a service registered in an OSGi service administrator may be recorded in this item. 'serviceID' may also be expressed as a service ID number registered in the OSGi service administrator. 'SCPDURL' indicates an URL including a position of a service description provided by the OSGi service administrator.

FIG. 7B illustrates an extract from a service description provided by the UPnP forum. As to some of items of the service description, 'actionname' may be expressed as a name of a method indicating a function capable of performing a service within an OSGi service interface. 'argumentlist' and sub tags may be expressed as arguments for the method within the OSGi service interface. 'stateVariable' is a variable indicating a state of every OSGi service within the UPnP device and may be provided as an event according to a change of the state of the service. For example, in the OSGi framework, a state variable called 'SERVICESTATE' may have 3 values: 'REGISTERED' indicating registration of a new service, 'MODIFIED' indicating a change of a service, and 'UNREGISTERED' indicating removal of a service. The UPnP device senses a change of its service configuration by using a change of the state variable, and sends an advertisement message for advertising a control point of an updated description.

According to the exemplary embodiments of the present invention, a service description can be dynamically updated according to a service configuration change such as installation and removal of a new protocol, and a control point can correctly control a controlled device whose service configuration has been changed by being informed by an advertisement of the service configuration change. Moreover, according to the exemplary embodiments of the present invention, an implementation method for expressing a UPnP device through an OSGi framework can be provided.

As described above, according to the exemplary embodiments of the present invention, a description is updated based on a change of a service configuration of a service and an update of the description is advertised, thereby dynamically matching the service configuration with a UPnP description. Moreover, based on an advertisement of a changed service description, a control point can correctly control a UPnP device whose service configuration is changed. Furthermore, according to the exemplary embodiments of the present invention, an implementation method for expressing a UPnP device through an OSGi framework can be provided.

Exemplary embodiments of the present invention can be embodied as computer-readable code on a computer-readable recording medium. The computer-readable recording medium may be any data storage device that can store data which can be thereafter read by a computer system.

Examples of computer-readable recording media include read-only memory (ROM), random-access memory (RAM), CD-ROMs, magnetic tapes, floppy disks, and optical data storage devices. The computer-readable recording medium can also be distributed over network of coupled computer systems so that the computer-readable code is stored and executed in a decentralized fashion. Also, functional programs, code, and code segments for executing the present invention can be easily construed by programmers of ordinary skill in the art.

While the present invention has been particularly shown and described with reference to exemplary embodiments thereof, it will be understood by one of ordinary skill in the art that various changes in form and detail may be made therein without departing from the spirit and scope of the present invention as defined by the following claims. Accordingly, the disclosed embodiments should be considered in a descriptive sense not in a restrictive sense. The scope of the present invention will be defined by the appended claims, and differences within the scope should be construed to be included in the present invention.

What is claimed is:

1. A method of providing a description, the method comprising:
sensing a change of a service configuration of a device;
updating a description of information about a service based on the change of the service configuration;
advertising that the description is updated; and
installing a new protocol providing a new service in the device, or removing a protocol from the device by controlling the device,
wherein sensing the change of the service configuration comprises sensing the installation of the new protocol or the removal of the protocol,
at least one of the sensing, the updating and the advertising are performed by a processor, and
wherein the updating comprises: obtaining a template of the description of information about the service; obtaining the information about the service; and inserting the obtained information about the service into the template to generate an updated description, and
wherein the inserting the obtained information about the service into the template is performed by inserting a value into a corresponding description item among description items of the template based on the obtained information,
wherein the service description comprises a function capable of performing a service and a variable indicating a state of a service within the device;
wherein the advertising comprises:
multicasting an advertisement message for advertising an availability of the service to a network which complies with a predetermined standard, wherein the predetermined standard is universal plug and play; and
unicasting an address, including an updated description, in response to a request from a control point that received the advertisement message.

2. The method of claim 1, wherein the sensing comprises sensing the change of the service configuration of the device based on a state variable which indicates the change of the service configuration.

3. The method of claim 1, further comprising revoking an advertisement performed prior to the updating the description.

4. The method of claim 1, wherein the device is implemented on an open service gateway initiatives (OSGi) framework and the change of the service configuration is expressed by using a state of an OSGi service.

5. A non-transitory computer-readable recording medium having recorded thereon a program for executing the method of claim 1.

6. The method of claim 1, wherein the format of the description comprises a template.

7. The method according to claim 1, wherein the new protocol or the protocol is one of a command set or a communication rule for providing the service.

8. The method according to claim 1, wherein the new protocol or the protocol is a device control protocol (DCP) for controlling the device.

9. The method according to claim 1, wherein the template is used to directly update the description of information about the service.

10. The method according to claim 1, wherein the template is a format for the description of information about the service.

11. An apparatus for providing a description, the apparatus comprising:
- a sensing unit, implemented in hardware, which senses a change of a service configuration of a device;
- a description updating unit which updates a description of information about a service based on the change of the service configuration;
- a communicating unit which advertises that the description is updated; and
- a protocol managing unit which installs a new protocol, providing a new service, in the device or removes a protocol from the device by controlling the device,
- wherein the service configuration is changed by installation or removal of the protocol, and
- wherein the description updating unit obtains a template of the description of information about the service and the information about the service and inserts the obtained information about the service into the template, thus generating an updated description, and
- wherein the inserting the obtained information about the service into the template is performed by inserting a value into a corresponding description item among description items of the template based on the obtained information,
- wherein the description of information about the service comprises a function capable of performing a service and a variable indicating a state of a service within the device;
- wherein the communicating unit:
- multicasts an advertisement message for informing a network of an availability of the service. the network complying with a predetermined standard, wherein the predetermined standard is universal plug and play; and
- unicasts an address, including an updated description, in response to a request from a control point that received the advertisement message.

12. The apparatus of claim 11, wherein the sensing unit senses the change of the service configuration of the device by based on a state variable which indicates the change of the service configuration.

13. The apparatus of claim 11, wherein the communicating unit revokes an advertisement performed before the description is updated.

14. The apparatus of claim 11, wherein the device is implemented on an open service gateway initiatives (OSGi) framework and the change of the service configuration is expressed by using a state of an OSGi service.

15. The apparatus according to claim 11, wherein the format of the description comprises a template.

* * * * *